(12) United States Patent
Rivlin et al.

(10) Patent No.: US 11,019,081 B1
(45) Date of Patent: *May 25, 2021

(54) SYSTEM AND METHOD OF DETECTING DELIVERY OF MALWARE USING CROSS-CUSTOMER DATA

(71) Applicant: FireEye, Inc., Milpitas, CA (US)

(72) Inventors: Alexandr Rivlin, Los Gatos, CA (US);
Divyesh Mehra, San Jose, CA (US);
Henry Uyeno, Sunnyvale, CA (US);
Vinay Pidathala, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,757

(22) Filed: Aug. 30, 2019

Related U.S. Application Data (63) Continuation of application No. 16/036,876, filed on Jul. 16, 2018, now Pat. No. 10,404,725, which is a continuation of application No. 15/470,816, filed on Mar. 27, 2017, now Pat. No. 10,027,696, which is a continuation of application No. 15/174,827, filed on Jun. 6, 2016, now Pat. No. 9,609,007.

(51) Int. Cl.
*H04L 29/06* (2006.01)
*H04L 12/58* (2006.01)
*G06F 9/455* (2018.01)

(52) U.S. Cl.
CPC ...... *H04L 63/1416* (2013.01); *G06F 9/45508* (2013.01); *H04L 51/12* (2013.01); *H04L 63/145* (2013.01); *H04L 63/1433* (2013.01); *H04L 63/1441* (2013.01)

(58) Field of Classification Search
CPC .............. H04L 63/145; H04L 63/1466; H04L 63/1475; H04L 63/16; H04L 63/20; H04L 63/1416; H04L 63/1425; H04L 63/1433; H04L 63/1441
See application file for complete search history.

(56) References Cited

U.S. PATENT DOCUMENTS

| | | | | |
|---|---|---|---|---|
| 8,566,928 | B2* | 10/2013 | Dagon | H04L 63/1441 726/22 |
| 8,578,497 | B2* | 11/2013 | Antonakakis | G06F 9/45508 726/24 |
| 8,776,180 | B2* | 7/2014 | Kumar | G06F 21/52 726/3 |
| 9,202,049 | B1* | 12/2015 | Book | H04L 63/20 |

(Continued)

*Primary Examiner* — Hosuk Song
(74) *Attorney, Agent, or Firm* — Rutan & Tucker, LLP (57) ABSTRACT

According to one embodiment, an electronic device features processing circuitry and memory that includes a first logic and a second logic. When executed by the processing circuitry, the first logic organizes (i) a first plurality of indicators of compromise (IOCs) received from a first source, where the first plurality of IOCs being caused by a known origin of a malicious attack, and (ii) one or more IOCs received from a second source that is different from the first source and an origin of the one or more IOCs is unknown. The second logic conducts a predictive analysis that evaluates whether the one or more IOCs have at least a degree of correlation with the first plurality of IOCs, and determines a threat level. The threat level signifies a degree of confidence that IOCs received from the second source are caused by the known origin of the first plurality of IOCs.

34 Claims, 8 Drawing Sheets

(56) References Cited

U.S. PATENT DOCUMENTS

| | | | |
|---|---|---|---|
| 9,363,280 B1 * | 6/2016 | Rivlin | ................ H04L 63/1433 |
| 9,609,007 B1 * | 3/2017 | Rivlin | .................... H04L 51/12 |
| 10,027,696 B1 * | 7/2018 | Rivlin | .................. H04L 63/145 |
| 10,404,725 B1 * | 9/2019 | Rivlin | ................ H04L 63/1441 |

* cited by examiner

SYSTEM AND METHOD OF DETECTING DELIVERY OF MALWARE USING CROSS-CUSTOMER DATA

CROSS-REFERENCE TO RELATED APPLICATIONS

This application claims the benefit of priority on U.S. application Ser. No. 16/036,876, filed Jul. 16, 2018, now U.S. Pat. No. 10,404,725 issued Sep. 3, 2019, which claims priority to U.S. application Ser. No. 15/470,816 filed Mar. 27, 2018, now U.S. Pat. No. 10,027,696, issued Jul. 17, 2018, which claims priority to U.S. application Ser. No. 15/174,827 filed Jun. 6, 2016, now U.S. Pat. No. 9,609,007, issued Mar. 28, 2017, which claims priority to U.S. application Ser. No. 14/466,898 filed Aug. 22, 2014, now U.S. Pat. No. 9,363,280 issued Jun. 7, 2016, the entire contents of which are incorporated by reference.

FIELD

Embodiments of the disclosure relate to the field of cybersecurity. More specifically, embodiments of the disclosure relate to a system and method for conducting a predictive analysis, based on information from a first customer, as to when indicators of compromise (IOCs) experienced by a second customer are caused by receipt of an undetected malicious electronic message.

GENERAL BACKGROUND

Currently, there exist a number of malware delivery techniques. A commonly used malware delivery technique involves the transmission of a malicious electronic mail (email) message to a computer or device controlled by a targeted user. Based on user activity, the malicious email message causes the computer to become infected. More specifically, the malicious email message may be structured to lure the targeted user to select a Uniform Resource Locator (URL) within the malicious email message which, upon selection, establishes communications with a web server that, unbeknownst to the user, is malicious. Thereafter, malware is uploaded and sensitive information may be subsequently downloaded from the infected computer.

For the last few years, anti-virus and email filtering industries have developed tools and techniques to identify and isolate potentially infected email messages. However, these traditional tools and techniques are not effective in detecting certain types of advanced, malicious email messages. To address this detection gap, one type of security appliance has been solely developed (and is currently available) to analyze an email message and determine whether the email message is likely infected with malware. In particular, this email analytic appliance analyzes incoming email messages, namely its header, content, links and attachments, in order to identify the presence of malware. Upon discovery of a malicious email message, the email analytic appliance alerts security personnel to quarantine the malicious email message and cleanse the infected computer.

Many customers deploy dedicated email analysis appliances as well as network monitoring appliances. However, some customers do not operate dedicated email analytic appliances. Instead, most of these customers simply deploy one or more security appliances that are configured to monitor network communications with one or more network devices to identify indicators of compromise (IOCs), namely malicious behaviors that suggest the presence of malware on a particular network device or particular network devices. While these types of security appliances are able to identify the presence of malware on a particular computer, they are not configured to analyze email messages for the presence of malware within these messages. As a result, without an email analytic appliance, a customer has no ability to reliably prevent delivery of malicious to targeted victim of attack. Protection against malicious email messages becomes more complex as the messages may lay dormant in the user's inbox for days or even weeks. This lack of detection has prolonged adverse effects on network security as subsequent malicious attacks may persist months later as long as the malicious email message is stored at an email server of the enterprise network and/or stored locally at a computer having access to the network.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Various embodiments of the disclosure relate to a platform and method for determining whether one or more indicators of compromise (IOCs) detected by a second customer (e.g., second source) have been caused by receipt of a malicious electronic message, even when no malicious electronic message has been directly observed by the second customer. More specifically, the platform is configured to conduct a predictive analysis that determines, based on a sufficient correspondence between IOCs detected by the second customer and IOCs associated with a particular malicious electronic message as detected and/or observed by one or more customers different than the second customer (e.g., a first source), whether the detected IOCs received from the second customer are caused by receipt of a malicious electronic message that is proximate in time and/or similar in content to the particular malicious electronic message.

According to one embodiment of the disclosure, a management platform receives anomalous behaviors, namely IOCs, from multiple customers having different security deployments. Herein, a first customer deploys at least a message analytic appliance that is specifically designed to protect against attacks delivered via malicious electronic messages such as email messages that includes a malicious attachment, a malicious text message, or the like. One example of a message analytic appliance is an email analytic appliance is a FireEye® EX™ security platform manufactured by FireEye, Inc. of Milpitas, Calif. The email analytic appliance performs an analysis on email messages directed to the first customer in efforts to determine whether there is a high probability of the email messages being part of a malicious attack.

Thereafter, the management platform qualifies heuristics associated with the IOCs from the second customer. In qualifying these heuristics, the management platform determines whether or not a triggering event has occurred, which causes a predictive analysis to be conducted on the detected IOCs from the second customer. According to one embodiment of the disclosure, the triggering event may include a significant increase or shift in volume of a given type of IOC by a particular (second) customer, where the increase or shift exceeds a prescribed threshold (e.g., a prescribed total number, a selected increase or decrease in number or percentage, etc.). The triggering event signifies to the management platform that the particular customer has a prescribed likelihood (e.g., greater than 50%, greater than 70%, or greater than 90%) that it is experiencing a malicious attack.

After qualifying heuristics associated with the detected IOCs from the second customer, the management platform conducts a predictive analysis that evaluates whether these detected IOCs correspond to a set (e.g., a sequence, a particular group, etc.) of IOCs associated with known malware of a first message type that has been detected by another (first) customer. This first message type may include electronic mail (email) messaging having a format in accordance with RFC 5322 or another email format, text messaging having a format in accordance with Short Message Service (SMS), or any other recognized or proprietary communication format. For instance, the IOCs associated with known malware of a first electronic message type may include (1) a set of IOCs associated with an email message that has been previously detected at the first customer as being malicious, (2) a set of IOCs associated with a text message that has been previously detected at the first customer as being malicious, or another type of transmission. Whether the detected IOCs correspond to the set of IOCs is based on a selected degree of correlation needed between the detected IOCs and the set of IOCs associated with known malware of the first message type, where the level of correlation may be static in nature or may vary dynamically based on desired warning trigger levels, current work load of the management platform, or the like. This degree of correlation may also be referred to as "degree of correspondence".

Thereafter, once the detected IOCs are initially determined to be associated with malware of the first message type (e.g., a non-detected malicious electronic message such as a malicious email message, a malicious text message, a malicious global satellite positioning "GPS" message, website post message, etc.), the predictive analysis conducted by the management platform further determines a threat level, which signifies a level of confidence that the detected IOCs are caused by a malicious electronic message. The threat level may be based, at least in part, on the degree of correspondence determined by the management platform between the detected IOCs from the second customer and the set of IOCs associated with known malicious messages. Also, the threat level may be based on the manner in which the IOCs associated with the malicious electronic message(s) have been uncovered. As an example, the threat level may be based, at least in part, on the following: (1) similarity in type or order of the detected IOCs to the set of IOCs associated with the malicious electronic message; (2) whether the set IOCs associated with the malicious electronic message were detected or observed; (3) timing of the detected IOCs compared to the IOCs associated with the malicious electronic message; and/or (4) a sudden change in magnitude (e.g., number) of one or more of the detected IOCs compared to the level before the IOC(s) were detected in malicious electronic message at first customer.

For instance, as an illustrative embodiment, the predictive analysis is conducted to determine a threat level based on (i) a qualification of heuristics at the second customer, (ii) a determination of correspondence between detected IOCs from the second customer and IOCs associated with one or more known malicious electronic messages from the first customer, and/or (iii) a determination as to the manner in which the IOCs from the first customer (and perhaps other customers) were uncovered (e.g., detected and/or observed IOCs). Where the management platform determines that the IOC(s) provided by the second customer correspond to one or more IOCs detected by the first customer, a first threat level is assigned.

Similarly, upon determining that the IOC(s) provided by the second customer correspond to one or more IOCs observed by the first customer, the management platform assigns a second threat level. Given that the first customer is actually observing IOCs rather than detecting IOCs through virtual processing operations observed in a run-time environment such as may be established in a virtual machine running in a threat detection platform (and implemented in a host, endpoint, server, dedicated appliance or other electronic device), a greater threat level may be assigned.

Lastly, where the management platform determines that the IOC(s) provided by the second customer correspond to one or more IOCs observed by multiple customers, including the first customer, a third threat level is assigned. The third threat level may signify a malware campaign is being conducted.

In summary, an embodiment of the invention is directed to utilizing IOCs that are correlated with malware that has infected a first customer (e.g., first source) in efforts to determine, based on analysis of IOCs detected at second customer (e.g., a different source than the first source), a likelihood that identical malware or similar malware (e.g., of the same malware family or polymorphic malware) has also infected one or more network devices at the second customer. This likelihood may be classified according to a plurality of threat levels that may be the same as or differ from the measured likelihood by the first customer of the IOCs being associated with malware. These threat levels may be based on whether the IOCs were detected (e.g., through static analysis of an object under analysis or dynamic processing of the object in a run-time environment) or observed in network traffic in flight or content (e.g., files) at rest as monitored by the first customer. However, it is contemplated that the threat levels may be associated with any threshold of associated maliciousness risk or probability, which may be static (fixed) or dynamic (variable, e.g., based on prevailing conditions and/or user threat tolerance and user preference at a particular time), in order to provide the second customer with information as to the likelihood of one of more network devices being infected with a certain type of known malware.

I. Terminology

In the following description, certain terminology is used to describe aspects of the invention. For example, in certain situations, both terms "logic" and "engine" are representative of hardware, firmware and/or software that is configured to perform one or more functions. As hardware, logic (or engine) may include circuitry having data processing or storage functionality. Examples of such processing circuitry may include, but is not limited or restricted to one or more processors or processor cores; a programmable gate array; a microcontroller; an application specific integrated circuit; receiver, transmitter and/or transceiver circuitry; semiconductor memory; or combinatorial logic.

Logic (or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device; and/or a semiconductor memory. As firmware, the executable code is stored in persistent storage.

The term "message" generally refers to information transmitted in a prescribed format, where each message may be in the form of one or more packets or frames, a Hypertext Transfer Protocol (HTTP) based transmission, or any other series of bits having the prescribed format. For instance, a message may include an electronic message such as an electronic mail (email) message; a text message in accordance with a SMS-based or non-SMS based format; an instant message in accordance with Session Initiation Protocol (SIP); or a series of bits in accordance with another messaging protocol. The message may be part of a "flow," namely a series of related packets that are communicated during a single communication session (e.g., Transport Control Protocol "TCP" session), between a source network device and a destination network device.

The term "malware" may be broadly construed as any information or action that is directed to adversely affect or disrupt operability of an electronic device, surreptitiously gather stored information and/or gain access to systems, or cause human interaction that results in unintended or unexpected outcomes. The malware may include an exploit that takes advantage of a software vulnerability, an advanced persistent threat (APT), or the like.

The term "transmission medium" is a physical or logical communication path within a network device such as an endpoint device, which is an electronic device with data processing and/or network connectivity such as, for example, a server; a stationary or portable computer including a desktop computer, laptop, electronic reader, netbook or tablet; a smart phone; a video-game console; wearable technology (e.g., watch phone, etc.). For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, a "set" of items generally relates a plurality of items although, in some case, a set may be broadly defined as including a single item. One type of "set" is a "sequence" of items that feature a particular order of occurrence.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Figure 1:
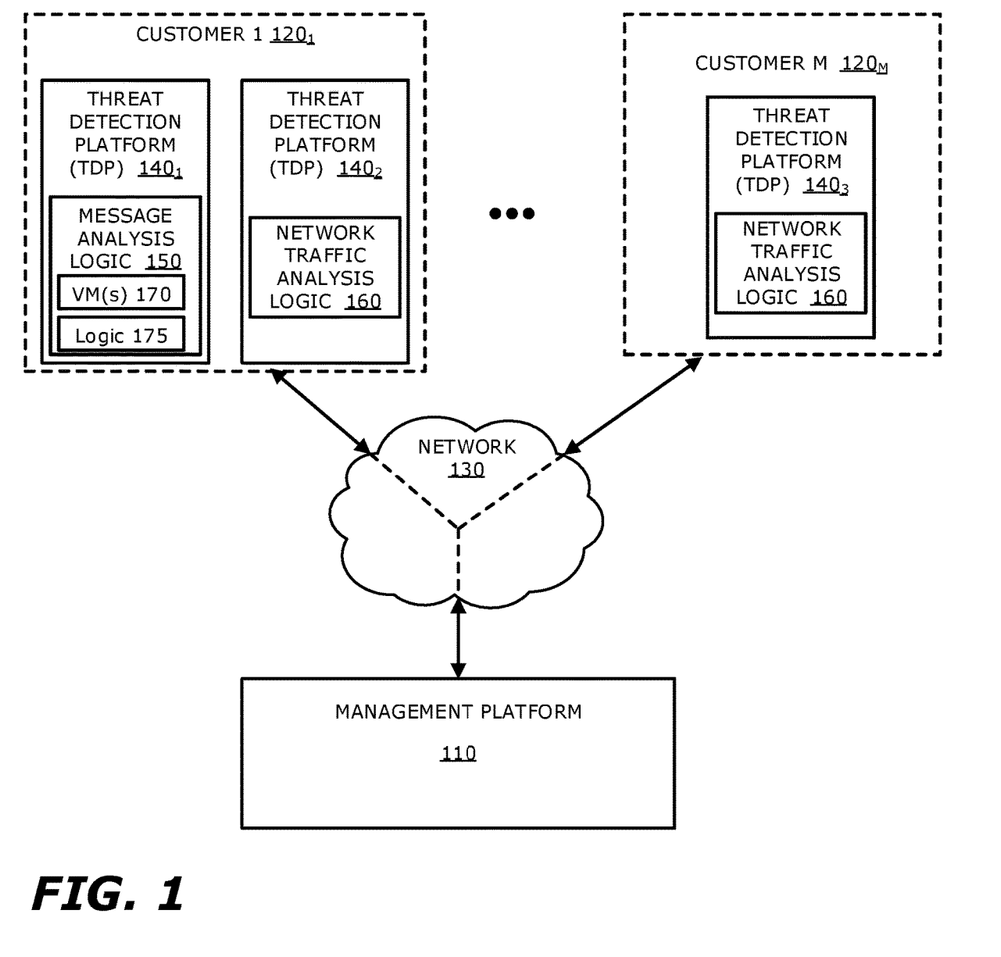
FIG. 1 is an exemplary block diagram of a communication network 100 deploying an embodiment of the invention.

Referring to FIG. 1, an exemplary block diagram of a communication network 100 deploying an embodiment of the invention is shown. Herein, the communication network 100 comprises a management platform 110 communicatively coupled to a plurality of customers $120_1$-$120_M$ (M>2, M=2 for this embodiment) via a network 130. The network 130 may include a public network such as the Internet, a private network (e.g., a local area network "LAN", wireless LAN, etc.), or a combination thereof. It is contemplated that the number and type of customers $120_1$-$120_M$, which are communicatively coupled to the same management platform 110, may be selected based on a variety of parameters, including industry or agency type (e.g., technology, manufacturing, energy, health care, entertainment, financial services, banking, governmental, etc.); field type (e.g., electronic component manufacturing, Internet services, etc.); geographical location of the customer; and/or requested level of service. It is contemplated that the grouping of customers $120_1$-$120_M$ based on certain parameters may improve detection as some malicious attacks may be industry, field and/or geographic specific.

Herein, each customer $120_1$, . . . , or $120_M$ may be broadly construed as a network-based entity, which includes one or more threat detection platforms (TDPs) where each TDP is configured to analyze information propagating into and/or from the network-based entity and upload one or more detected indicators of compromise (IOCs) destined for the management platform 110. The network-based entity may represent an organization, a subset of the organization (e.g. a subsidiary where different customers may be different subsidiaries that are part of the same parent organization, a division, group, etc.), a particular enterprise network, or the like.

According to one embodiment of the disclosure, as shown in FIG. 1, the first customer $120_1$ may include, at least in part, one or more threat detection platforms (TDPs), such as a first TDP $140_1$ and a second TDP $140_2$ for this embodiment. As shown, the first TDP $140_1$ is a network device that includes message analysis logic 150 and a second TDP $140_2$ is a network device operating as a web-based security appliance that includes network traffic analysis logic 160. Similarly, a second customer $120_2$ may include, at least in part, one or more threat detection platforms (TDPs), such as a third TDP $140_3$ in this embodiment.

As described below in detail, the message analysis logic 150 of the first TDP $140_1$ is configured to conduct a specific analysis of the content of a message of a first format type (e.g., email messages, text messages, etc.) transmitted and/or received over the network 130. Based on this analysis, the first TDP $140_1$ is capable of determining whether a malicious attack originated from a malicious electronic message and the particular malicious electronic message. The second network traffic analysis logic 160 of the second TDP $140_2$ is configured to conduct an analysis of information associated with network traffic over the network 130 in efforts to determine if this information suggests the presence of a malicious attack. But, without the first TDP $140_1$, the second TDP $140_2$ is unable to determine whether the origin of the malicious attack is from a malicious electronic message.

More specifically, according to one embodiment of the disclosure, the first TDP $140_1$ is deployed in a customer's public network (sometimes referred to as the "Demilitarized Zone" or "DMZ"), where email servers most often reside. Of course, the location of the TDP $140_1$ may vary, provided that the TDP $140_1$ has access to the communication path of the transmitted messages and is communicatively coupled to the management platform 110. For instance, the TDP $140_1$ could be deployed outside of customer's premises. For instance, where the message is a SMS message, the TDP $140_1$ could be deployed in a cell carrier network. Furthermore, the TDP $140_1$ may be part of cloud services, or even deployed within an endpoint device (e.g., smartphone, computer, etc.).

Herein, the message analysis logic 150 enables the first TDP $140_1$ to operate, at least in part, as an email analytic appliance by performing an analysis of one or more portions of an incoming email message, namely its header, content, links and/or attachments. This analysis may be performed by one or more virtual machines (hereinafter "virtual machine(s)" or "VM(s)" 170) deployed within the first TDP $140_1$. Each of the virtual machine(s) may be configured with a software profile, which corresponds to a particular message management application (e.g., Microsoft® Outlook, iPad™ native email application, native email application on Windows® Phone 8, etc.) that is being used by a network device deployed within the same enterprise network as the first TDP $140_1$. The virtual machine(s) may be configured to support concurrent virtual execution of a variety of different software configurations in efforts to verify that a malicious email message is part of a malicious attack.

The virtual machine(s), in combination with other logic (e.g., processing logic 175) within the first TDP $140_1$, are adapted to simulate the receipt and execution of content associated with the malicious email message within a run-time environment as expected by the email message. For instance, the processing logic 175 is configured to emulate and provide anticipated signaling to the virtual machine(s) during virtual processing.

As an example, the processing logic 175 may be adapted to provide, and sometimes modify, information (e.g., an Internet Protocol "IP" address, etc.) associated with an email message under analysis in order to control return signaling back to a virtual execution environment that includes the virtual machines. Hence, the processing logic 175 may suppress (e.g., discard) the return network traffic so that the return network traffic is not transmitted to the network 130.

Unlike the first TDP $140_1$, both the second TDP $140_2$ and the third TDP $140_3$ include network traffic analysis logic 160, which operates as a web-based security appliance by analyzing information associated with network traffic over the network 130 to determine if the information suggests the occurrence of a malicious attack. By itself without operability of the first TDP $140_1$, neither the second TDP $140_2$ nor the third TDP $140_3$ is able to determine the origin of the malicious attack. An illustrative example of the network traffic analysis logic 160 is illustrated as the MCD System in a prior U.S. Patent Application entitled "Dynamically Remote Tuning of Malware Content Detection System," U.S. patent application Ser. No. 14/231,216 filed Mar. 31, 2014, the contents of which are incorporated by reference.

Referring still to FIG. 1, the management platform 110 is adapted to receive information from the plurality of customers $120_1$-$120_M$, notably TDPs $140_1$-$140_3$. As shown, the first TDP $140_1$ and the second TDP $140_2$ are associated with the first customer $120_1$ and the third TDP $140_3$ is associated with a second customer $120_2$. Upon receipt of information from the TDPs $140_1$-$140_3$, the management platform 110 qualifies heuristics associated with the received information in order to determine if the received information indicates that a malicious attack is occurring. Of course, certain heuristics may be specifically selected for analysis during the qualification operations, as these specific heuristics may be directed to functionality normally targeted by a malware attack via a malicious email message. The "heuristics" may encompass rules, policies, statistics, signatures, hash values, or other determinative attributes or characteristics of received information under analysis, and thus, qualification of the heuristics involves analysis of the received information based on the heuristics.

As an illustrative example, after receipt of received information including indicators of compromise (IOCs), namely information associated with anomalous behaviors detected by network traffic analysis logic 160 within the TDP $140_3$, the management platform 110 qualifies the heuristics associated with the IOCs in order to determine whether a triggering event has occurred, which identifies that a malicious (email-based) attack may be occurring at the second customer $120_2$. For instance, the management platform 110 may determine whether a particular IOC-based threshold has been met (e.g., exceeds or falls below the threshold). As an example, the particular IOC-based threshold may be associated with an average number of a certain type of IOC detected by multiple TDPs with network traffic analysis logic (or perhaps TDP $140_3$ by itself) over a prescribed amount of time. This threshold is met if the detected IOCs are equal to or greater in number that the IOC average. Of course, other types of thresholds may be used, including a preselected number of total IOCs that may be dependent or independent of type, mere presence of a particular type of IOC, or the like.

If the IOC heuristics have been qualified, the management platform 110 conducts a predictive analysis associated with the detected IOCs received from the TDP $140_3$ to determine if these IOCs correspond to a set of IOCs associated with known malware of a first message type that are provided from the TDP $140_1$. For instance, the amount of similarity between the detected IOCs and the set of IOCs associated with the known malware of the first message type in order to determine whether the detected IOCs correspond to the set of IOCs may be static or dynamic in nature (e.g., the degree of correspondence between detected IOCs and the IOCs associated with the known malware may vary based on the operating state of the management platform 110). For instance, when the management platform 110 is operating in a first operating state, the degree of correspondence may be set at a high level where the detected IOCs need to be present and in the same chronological order as the set of IOCs associated with the known malware. Alternatively, when the management platform 110 is operating in a second operating state, the degree of correspondence may be set at a lower level where the detected IOCs correspond to the known malware IOCs if multiple (but not all) IOCs of the detected IOCs are present in the set of IOCs.

When the IOC heuristics have been qualified and the predictive analysis concludes, with a certain degree of confidence that the detected IOCs are associated with a malicious attack originating from a malicious email message, the management platform 110 determines a type of response. As an illustrative example, the management platform 110 may adjust the threat level, which is associated with the degree of confidence that the detected IOCs are caused by a malicious electronic message, based on whether the set of IOCs associated with the known malware of the first message type are detected by the TDP $120_1$ during static and/or virtual processing of the malicious electronic message or are actual observed behavior(s) by a network device communicatively coupled to the TDP $140_3$. Herein, actual observed behavior(s) are assigned a higher threat level than detected behavior(s). More details of the assignment of threat level are described in FIG. 6.

Figure 2A:
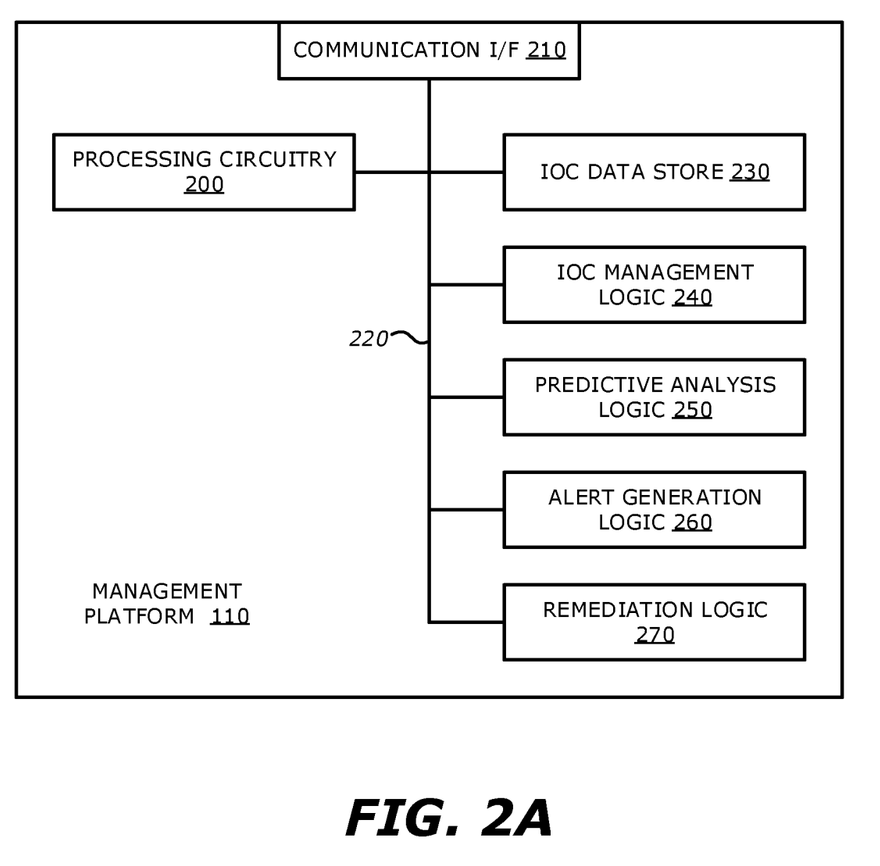
FIG. 2A is a block diagram of an exemplary embodiment of the management platform 110 of FIG. 1.

Referring now to FIG. 2A, a block diagram of an exemplary embodiment of the management platform 110 is shown. Herein, the management platform 110 includes processing circuitry 200 that are coupled to communication interface logic 210 via a first transmission medium 220. Communication interface logic 210 enables communications with customers $120_1$-$120_M$, notably one or more TDP $140_1$-$140_3$ deployed by the customers as shown in FIG. 1. According to one embodiment of the disclosure, communication interface logic 210 may be implemented as a physical interface including one or more ports for wired connectors. Additionally, or in the alternative, communication interface logic 210 may be implemented with one or more radio units for supporting wireless communications with other electronic devices.

As shown, processing circuitry 200 is further coupled to a data storage 230, IOC management logic 240, predictive analysis logic 250, alert generation logic 260 and remediation logic 270. According to one embodiment of the disclosure, the IOC management logic 240 is configured to acquire information associated with detected and/or observed anomalous behaviors (IOCs) from the customers $120_1$-$120_M$, where the IOCs may be acquired based upon actions by security personnel manually controlling the maintenance platform 110 to obtain the IOCs in response to an event or an elapsed period of time. Alternatively, the IOCs from the customers $120_1$-$120_M$ may be received automatically in accordance with a periodic or aperiodic uploading of the IOCs. The uploading may be accomplished by a push, pull or polling technique in which the TDPs $140_1$-$140_3$ are configured to automatically transmit the IOCs in response to an activity (e.g., detection of the triggering event that identifies that a malicious, email-based attack may be occurring) and/or expiration of an elapsed period of time.

Upon receiving IOCs from TDPs $140_1$-$140_3$ shown in FIG. 1, the IOC management logic 240 stores the received IOCs within the data store 230, which may be organized to identify which IOCs are received from which customers and which IOCs are associated with known malware associated with a particular message type. For instance, the IOCs may be organized to identify which IOCs are associated with known malicious electronic messages, where these IOCs include the anomalous behaviors and/or metadata associated with the malicious electronic messages. Examples of the metadata may include the arrival time of the message and/or profile information associated with the recipient, which may include one or more of the following: geographical origin of the recipient, group membership, company type, industry type, or the like.

Thereafter, the IOC management logic 240 qualifies heuristics associated with the detected IOCs from the third TDP $140_3$ of FIG. 1 by determining whether a triggering event has occurred to denote that a malicious attack due to a non-detected malicious electronic message may be occurring at the second customer $120_2$. The triggering event activates predictive analysis logic 250, which causes a predictive analysis to be conducted on the detected IOCs from the second customer $120_2$ of FIG. 1. As described above, the triggering event may include an increase or shift in volume of a given type of IOC by a particular (second) customer that exceeds a prescribed threshold.

More specifically, the predictive analysis logic 250 conducts a predictive analysis that evaluates whether the detected IOCs from the second customer $120_2$ of FIG. 1 correspond to a set of IOCs associated with known malware of a first message type that has been detected by another customer (e.g., first customer $120_1$). For instance, the set of IOCs may be associated with a known type of malicious email message or a known type of malicious text message.

Thereafter, once the detected IOCs are initially determined to be associated with a non-detected malicious (email or text) message, the predictive analysis logic 250 further determines a threat level, which signifies a degree of confidence that the detected IOCs are caused by a malicious email message or a malicious text message. The threat level may be based, at least in part, on the degree of correspondence determined by the predictive analysis logic 250 between the detected IOCs from the second customer $120_2$ of FIG. 1 and the set of IOCs associated with known malicious electronic messages. Additionally, the threat level may be based on the manner in which the set of IOCs associated with the malicious electronic message(s) was uncovered, where observed IOCs provide a greater weighting and a higher threat level than detected IOCs and observations by multiple customers increase the threat level.

The alert generation logic 260 and the remediation logic 270 perform operations based, at least in part, on the determined threat level. For instance, in response to computation of a first threat level, the alert generation logic 260 may merely issue an alert to security personnel of the second customer. However, in response to computation of a first threat level, the alert generation logic 260 may generate multiple alerts, in which the alerts may be sent through different mediums (e.g., network email, text message, automated cellular telephone call, etc.). Also, the remediation logic 270 may operate to provide suggested actions to remediate the potential malicious email message (e.g., search email servers for email messages associated with a particular phrase in the subject line or originating from a particular domain, specific attachment, specific size, originated from a specific source IP or MAC address, arrival time within a particular time period (e.g., range in minutes, hours or days), block the potential malicious email message from being opened or processed, and/or automatically delete the potential malicious email message with or without user notification).

Figure 2B:
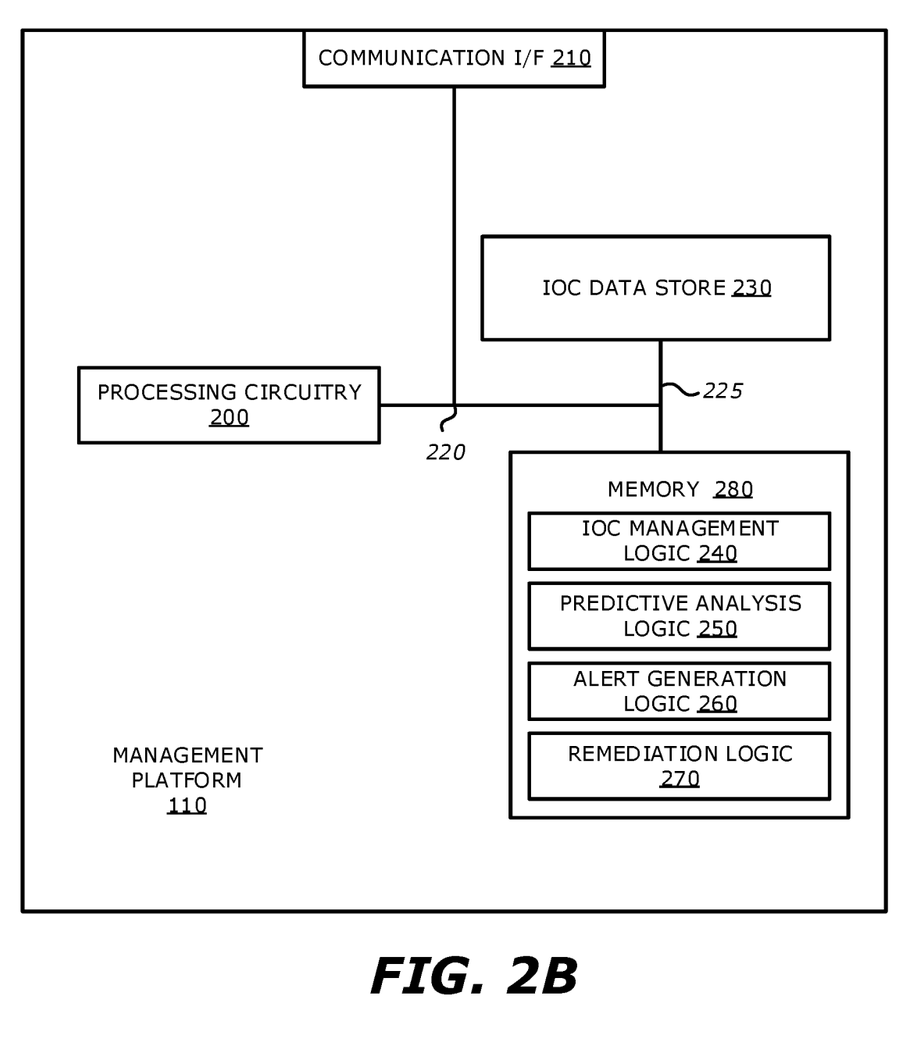
FIG. 2B is a block diagram of an exemplary embodiment of a logical representation of the management platform 110 of FIG. 1.

Referring now to FIG. 2B, a block diagram of an exemplary embodiment of a logical representation of the management platform 110 is shown. Herein, the management platform 110 includes processing circuitry 200 that are coupled to the communication interface logic 210 via the first transmission medium 220 as well as the data store 230 and persistent storage 280 via a second transmission medium 225.

According to one embodiment of the disclosure, persistent storage 280 may include (a) the IOC management logic 240; (b) the predictive analysis logic 250; (c) the alert generation logic 260; and (d) the remediation logic 270. Of course, when implemented partially or fully in hardware, one or more of these logic units could be implemented separately from each other.

Figure 3:
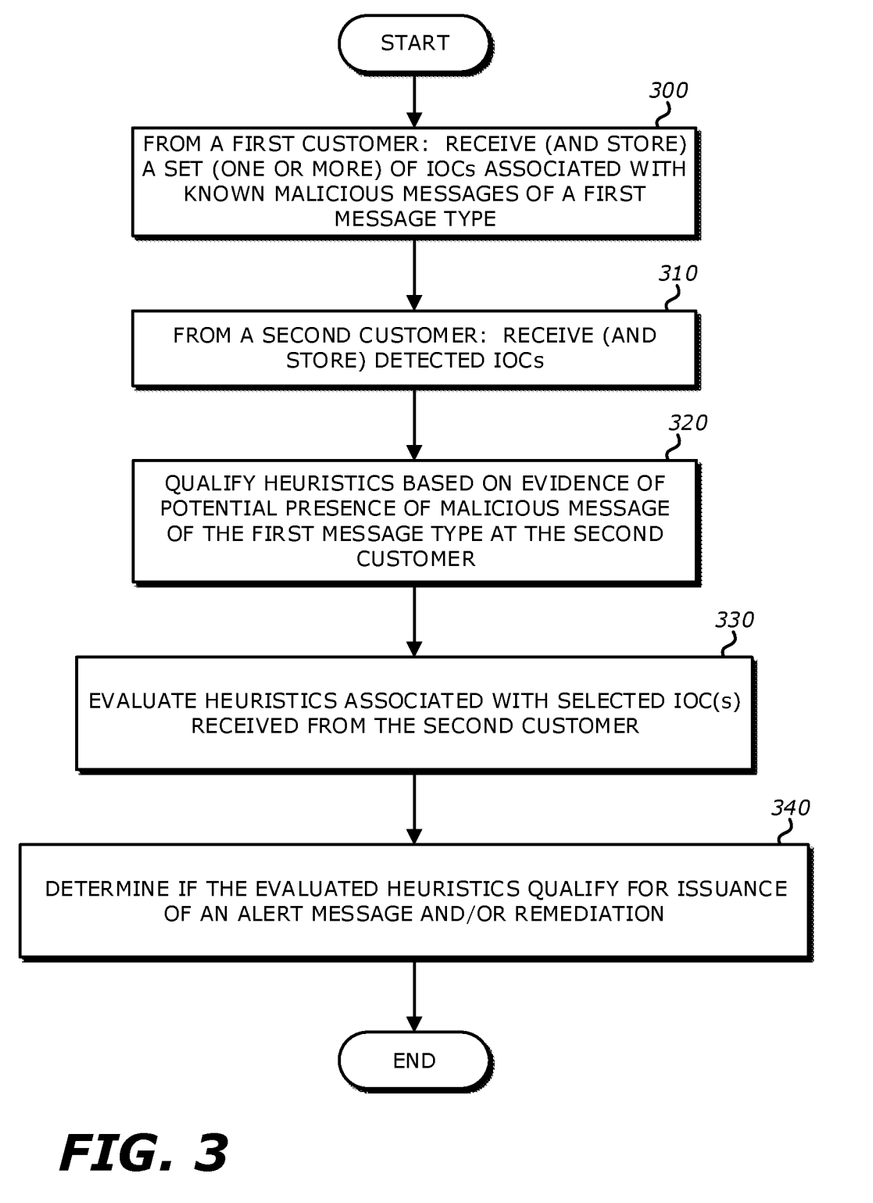
FIG. 3 is an illustrative embodiment of the operations conducted by the management platform 110 of FIG. 1 for conducting a predictive analysis.

Referring now to FIG. 3, an illustrative embodiment of the operations conducted by the management platform 110 of FIG. 1 for conducting a predictive analysis, based on IOCs provided from a first customer, to determine that a malicious attack is being conducted by a malicious electronic message on a second customer is shown. The management platform 110 receives and stores IOC information from a plurality of customers, including at least one set of IOCs associated with known malicious electronic message from the first customer and detected IOCs from the second customer (blocks 300 and 310).

Thereafter, the management platform qualifies heuristics associated with the detected IOCs from the second customer in order to establish evidence of a potential presence of a malicious electronic message of a first message type at the second customer (block 320). Thereafter, the management platform evaluates heuristics associated with selected IOCs, which may be part or all of the detected IOCs, and determines if the evaluated heuristics qualify for issuance of an alert message and/or remediation (blocks 330 and 340).

Figure 4:
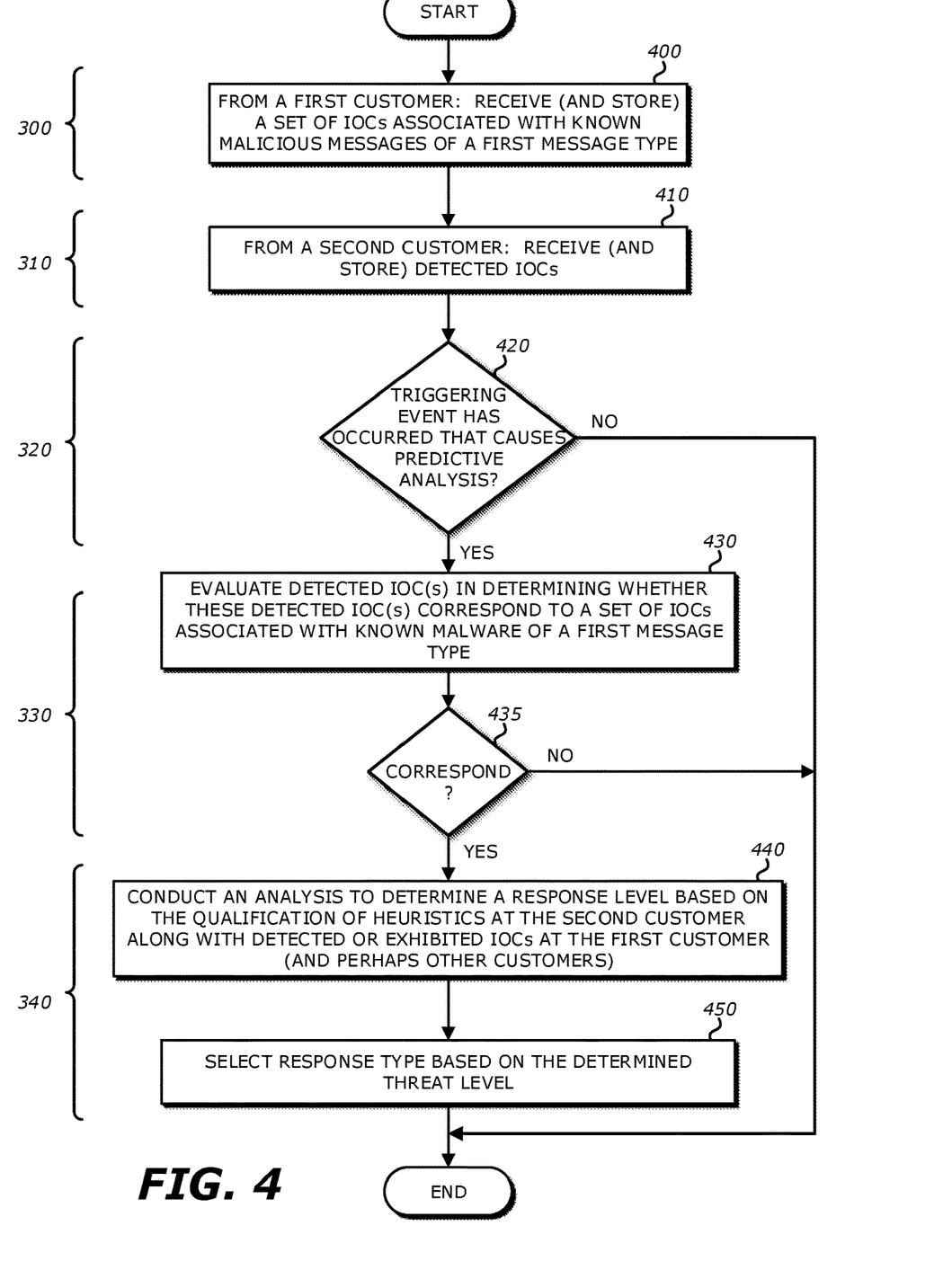
FIG. 4 is a detailed embodiment of the operations in conducting predictive analysis by the management platform.

Referring to FIG. 4, a detailed embodiment of the operations conducted by the management platform as set forth in FIG. 3 for conducting predictive analysis is shown. The management platform 110 receives and stores IOC information from a plurality of customers, including at least one set of IOCs associated with known malicious electronic message from the first customer and detected IOCs from the second customer (blocks 400 and 410).

Thereafter, the management platform qualifies heuristics associated with the IOCs from the second customer by determining whether a triggering event has occurred that causes a predictive analysis to be conducted on the detected IOCs from the second customer (block 420). For instance, as an illustrative example, the triggering event may include a condition where the detected IOCs from the second customer indicate that a selected threshold has been met (e.g., a particular increase or decrease in volume of a given type or types of IOCs has occurred, etc.).

After determining that a triggering event has occurred, the management platform conducts a predictive analysis that evaluates whether these detected IOCs correspond to a set of IOCs associated with known malware of a first message type that has been detected by first customer (blocks 430 and 435). For instance, as an illustrative example, the ordering and content of the IOCs are compared with the set of IOCs.

Thereafter, once the detected IOCs are determined to correspond to the set of IOCs, a predictive analysis is conducted by the management platform to determine a threat level that signifies a degree of confidence that the detected IOCs are caused by a malicious electronic message (block 440). The threat level may be based, at least in part, on a qualification of heuristics at the second customer, such as the degree of correspondence determined by the management platform between the detected IOCs from the second customer and the set of IOCs associated with known malicious electronic messages. Also, the threat level may be based on the manner in which the IOCs associated with the malicious electronic message(s) were uncovered. As an example, the threat level may be based, at least in part, on the following: (1) similarity of the detected IOCs to the set of IOCs associated with the malicious electronic message; (2) whether the set IOCs associated with the malicious electronic message were detected or observed; and/or (3) timing of the detected IOCs compared to the IOCs associated with the malicious electronic message.

Figure 5:
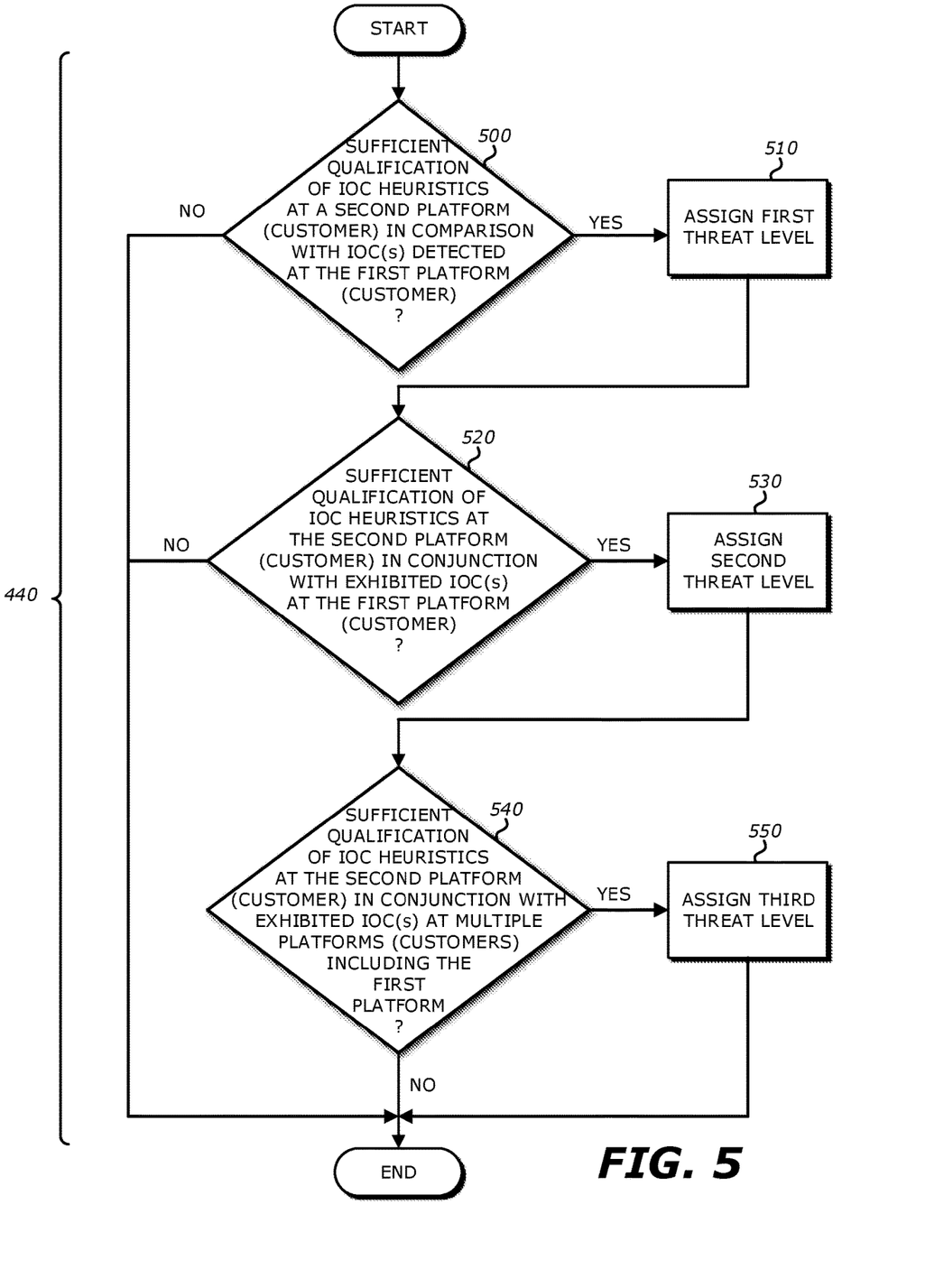
FIG. 5 is an exemplary embodiment of the predictive analysis conducted by the management platform in determining a threat level that signifies a degree of confidence that the detected IOCs are caused by a malicious electronic message.

As an illustrative embodiment, as shown in FIG. 5, a first determination is made as to whether there is sufficient qualification of IOC heuristics at the second customer compared to IOCs detected at the first customer and associated with a malicious electronic message (block 500). If there are sufficient qualifications in that the detected IOCs of the second customer correspond to IOCs detected by the first customer, a first threat level is assigned (block 510). Otherwise, no threat level is assigned to signify that there is no apparent correspondence between the detected IOCs at the second customer and IOCs associated with a malicious electronic message.

Thereafter, a second determination is made as to whether there is sufficient qualification of IOC heuristics at the second customer compared to IOCs observed at the first customer and associated with a malicious electronic message (block 520). If there are sufficient qualifications in that the detected IOCs of the second customer correspond to IOCs observed by the first customer, a second threat level is assigned (block 530). Otherwise, the predictive analysis maintains that the detected IOCs from the second customer to the assigned first threat level.

Lastly, a third determination is made as to whether there is sufficient qualification of IOC heuristics at the second customer compared to IOCs observed at multiple customers, inclusive of the first customer (block 540). If there are sufficient qualifications in that the detected IOCs of the second customer correspond to IOCs observed by multiple customers including the first customer, a third threat level is assigned (block 550). Otherwise, the predictive analysis maintains that the detected IOCs from the second customer to the assigned second threat level.

Referring back to FIG. 4, a particular type of response is selected based on the determined threat level (block 450). For instance, in accordance with an illustrative embodiment shown in FIG. 6, after the management platform has determined the threat level associated with detected IOCs under analysis from the second customer (block 600), the threat level is used to determine the response type (blocks 610-650). More specifically, if the qualification results in a first threat level, a first level response is conducted (blocks 610 and 620). As an illustrative example, an alert message may be sent to security personnel associated with the second customer with information pertaining to a potential malicious email message that may be stored within one of its email servers.

Figure 6:
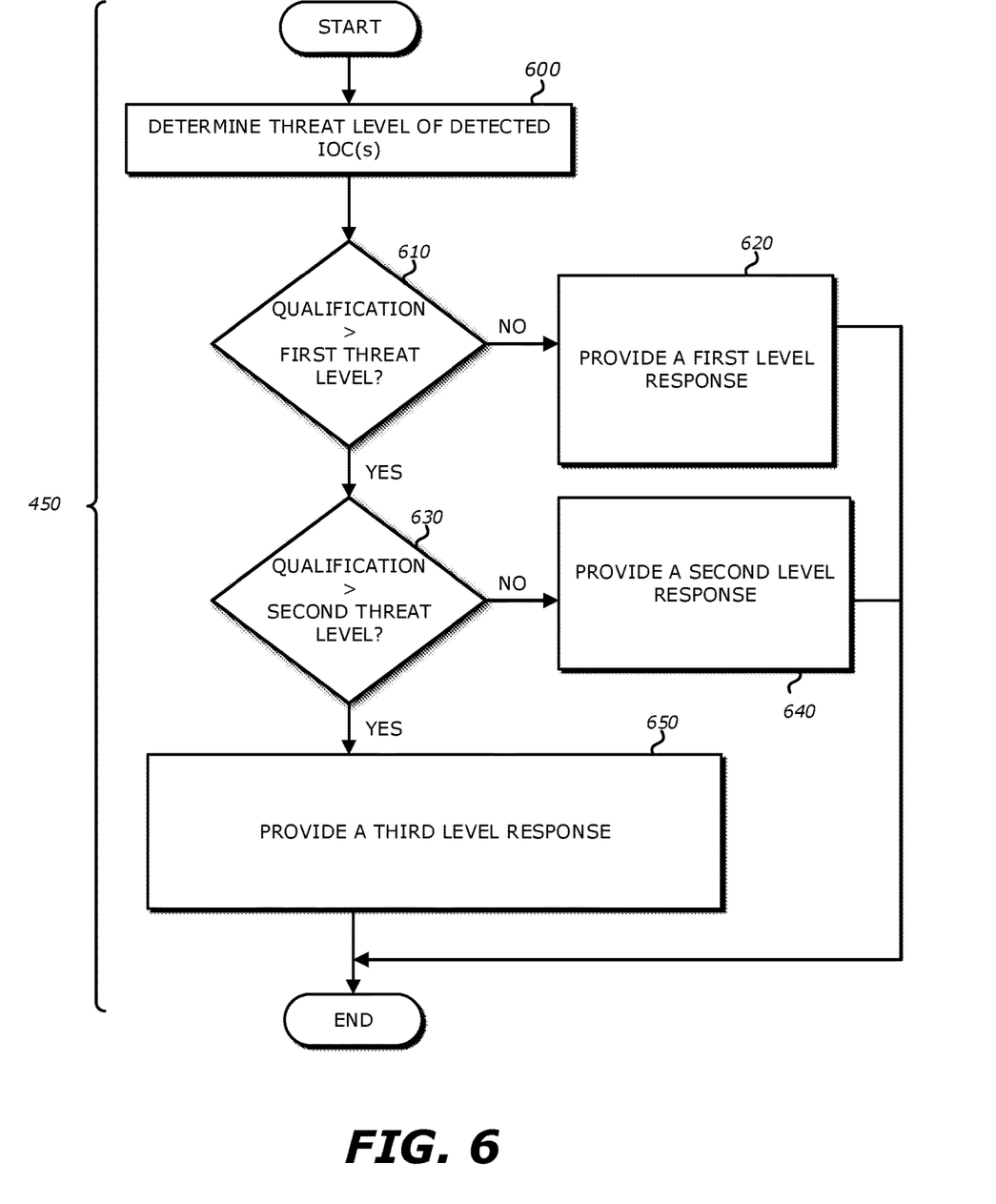
FIG. 6 is an exemplary embodiment of a first response scheme that includes selection of different response levels by the management platform based on the determined threat level.

Similarly, if the qualification results in a second threat level, a second level response is conducted (blocks 630 and 640). The second level response may be assigned higher urgency than the first level response. For example, an alert message may be sent to security personnel associated with the second customer with information pertaining to a potential malicious email message that may be stored within one of its email servers along with additional information including contact information for security personnel and/or marketing representatives associated with the management platform.

Otherwise, the qualification resulted in a third threat level, and thus, warrants that a third level response is conducted (block 650). The third level response may be assigned the highest urgency. For example, multiple alert messages may be sent to security personnel associated with the second customer with information pertaining to a potential malicious email message that may be stored within one of its email servers. These alert messages may be successive or through different mediums (e.g., email message, text message over a cellular network, etc.). Additionally, additional information including contact information for security personnel and/or marketing representatives associated with the management platform may be provided.

Figure 7:
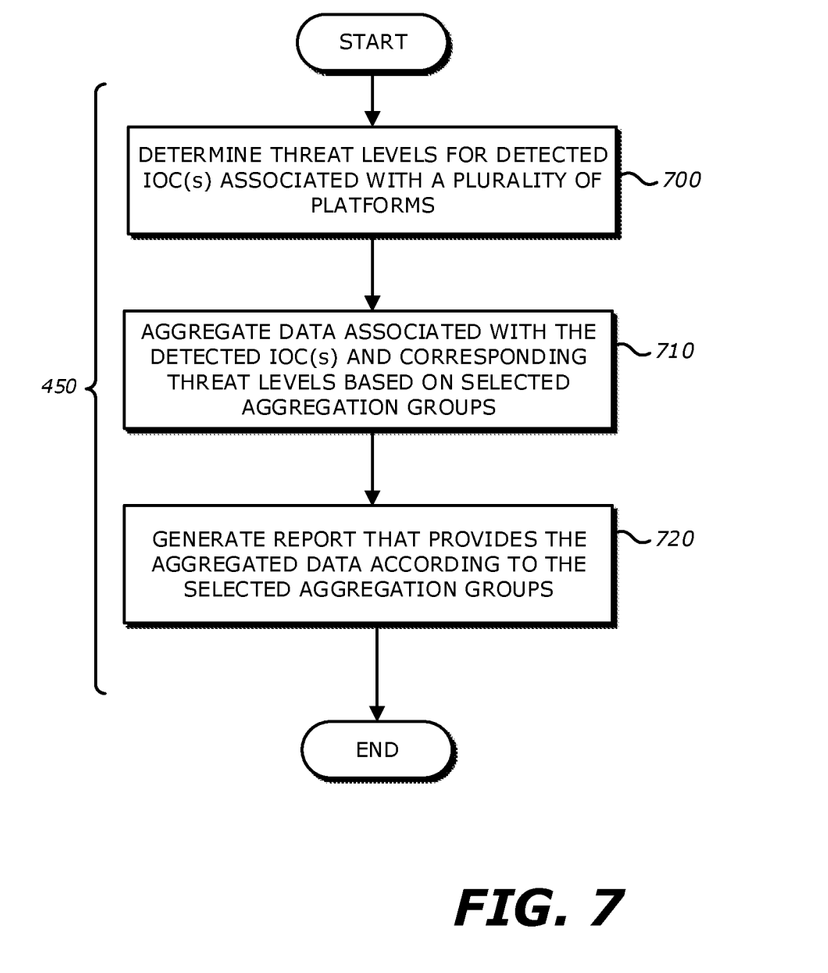
FIG. 7 is an exemplary embodiment of a second response scheme by the management platform upon determining specific threat levels for the detected IOCs.

In lieu of transmitting messages to the customers as shown in FIG. 6, as an alternative embodiment, the particular type of response selected may be directed as to whether a report should be generated that provides aggregated data of potential malicious electronic messages that have not been detected by customers without an email analytic appliance. Herein, as shown in FIG. 7, the management platform determines threat levels for the detected IOCs associated with a plurality of customers without message analytic appliances (block 700). The data associated with the detected IOCs and corresponding threat levels are aggregated based on selected aggregation groups (block 710). These aggregation groups may be subsets or supersets of the grouping supported by the management platform. After aggregating the data associated with the detected IOC(s) and the corresponding threat level information, the management platform generates reports that provide such information according to the selected aggregation groups (block 720).

In the foregoing description, the invention is described with reference to specific exemplary embodiments thereof. It will, however, be evident that various modifications and changes may be made thereto without departing from the broader spirit and scope of the invention as set forth in the appended claims. For instance, the above-described analysis is applicable to electronic messages as well as other types of objects under analysis (e.g. Portable Document Format "PDF" documents, executables, web downloads, etc.).

What is claimed is:

1. An electronic device, comprising:
   processing circuitry; and
   a memory coupled to the processing circuitry, the memory includes
      a first logic that, when executed by the processing circuitry, organizes (i) a first plurality of indicators of compromise (IOCs) received from a first source, where the first plurality of IOCs being associated with a known origin of a malicious attack, and (ii) one or more IOCs received from a second source, the second source being different from the first source, and
      a second logic that, when executed by the processing circuitry, determines that the one or more IOCs received from the second source originated from the known origin undetected by the electronic device based on (i) determining that the one or more IOCs have at least a degree of correlation with the first plurality of IOCs that satisfies a first threshold, and (ii) determining that a threat level associated with the one or more IOCs satisfies a second threshold to signify a degree of confidence that the one or more IOCs are associated with the known origin of the first plurality of IOCs.

2. The electronic device of claim 1, wherein the known origin of the malicious attack corresponds to a type of message including an electronic mail message detected by the first source as including malware.

3. The electronic device of claim 1, wherein the known origin of the malicious attack corresponds to a type of message including a text message detected by the first source as including malware.

4. The electronic device of claim 1, wherein the first logic determining that a triggering event has occurred in response to an increase in a number of occurrences or percentage of occurrences of a particular type of behavior being one of the first plurality of IOCs, the triggering event to cause the second logic to determines that the one or more IOCs received from the second source originated from the known origin undetected by the electronic device.

5. The electronic device of claim 1, wherein the first logic determining that a triggering event has occurred, the triggering event signifies a likelihood that the one or more IOCs from the second source is caused by an undetected malicious electronic message present at the second source.

6. The electronic device of claim 1, wherein the degree of correlation between the one or more IOCs and the first plurality of IOCs is varied based on an operating state of the electronic device.

7. The electronic device of claim 1, wherein the degree of correlation between the one or more IOCs and the first plurality of IOCs is set to a first level when the electronic device is in a first operating state, the first level requires the one or more IOCs to be in a same chronological order and present within the first plurality of IOCs.

8. The electronic device of claim 1, wherein at least the first source corresponds to a cloud service.

9. A computerized method, comprising:
   receiving data associated with behaviors detected by a first source, the data associated with the behaviors from the first source being obtained from an analysis of one or more portions of a message by the first source; and
   performing a predictive analysis on the received data associated with the behaviors detected by the first source by at least (i) evaluating whether the data associated with the behaviors has at least a prescribed degree of correlation with data associated with a first plurality of behaviors received from at least a second source, where the first plurality of behaviors being associated with a known malware detected by the second source, and (ii) determining a threat level signifying at least a degree of confidence that the data associated with the behaviors received from the first source are caused by an undetected malicious electronic message at the first source.

10. The method of claim 9, wherein the predictive analysis determines whether the behaviors detected by the first source have been caused by the known malware detected by the second source.

11. The method of claim 9, wherein the undetected malicious electronic message corresponds to an electronic mail message.

12. The method of claim 9, wherein prior to performing the predictive analysis, the method further comprising:
   determining whether a triggering event has occurred and performing the predictive analysis in response to an occurrence of the triggering event.

13. The method of claim 12, wherein the triggering event is determined to occur by at least detecting a shift in number or percentage of a type of behavior, where the shift in number exceeds a prescribed threshold.

14. The method of claim 13, wherein the shift in number corresponds to an increase in number or percentage of indicators of compromise, each of the indicators of compromise corresponding to a malicious behavior.

15. The method of claim 9, wherein the evaluating whether the data associated with the behaviors has at least a prescribed degree of correlation with the data associated with the first plurality of behaviors comprises determining the degree of correlation between known indicators of compromise to indicators of compromise corresponding to the data associated with the behaviors detected by the first source.

16. The method of claim 9, wherein the determining of the threat level is based on a determination of a similarity in type or order of the received data associated with the behaviors detected by the first source and the data associated with the first plurality of behaviors received from the second source.

17. The method of claim 9, wherein the determining of the threat level is based on a determination of a prescribed change in number of indicators of compromise being at least a portion of the data associated with the behaviors detected by the first source.

18. The method of claim 9, wherein the degree of correlation between the data associated with the behaviors and the data associated with the first plurality of behaviors is varied based on an operating state of an electronic device performing the predictive analysis.

19. The method of claim 18, wherein the degree of correlation between the data associated with the behaviors and the data associated with the first plurality of behaviors is set to a first level when an electronic device performing the predictive analysis is in a first operating state, the first level requires the data associated with the behaviors to be in a same chronological order and present within the data associated with the first plurality of behaviors.

20. A non-transitory storage medium including software that, when executed, performs a plurality of operations comprising:
receiving data associated with behaviors detected by a first source, the data associated with the behaviors from the first source being obtained from an analysis of one or more portions of a message by the first source; and
performing a predictive analysis on the received data associated with the behaviors detected by the first source by at least (i) evaluating whether the data associated with the behaviors has at least a prescribed degree of correlation with data associated with a first plurality of behaviors received from at least a second source, where the first plurality of behaviors being associated with a known malware detected by the second source, and (ii) determining a threat level signifying at least a degree of confidence that the data associated with the behaviors received from the first source are caused by an undetected malicious electronic message at the first source.

21. The non-transitory storage medium of claim 20, wherein the software performs the predictive analysis by at least determining whether the behaviors detected by the first source have been caused by the known malware detected by the second source.

22. The non-transitory storage medium of claim 20, wherein the undetected malicious electronic message corresponds to an electronic mail message.

23. The non-transitory storage medium of claim 20, wherein prior to performing the predictive analysis, the software further performs an operation that comprises determining whether a triggering event has occurred and performing the predictive analysis in response to an occurrence of the triggering event.

24. The non-transitory storage medium of claim 23, wherein the triggering event is determined to occur by at least detecting a shift in number or percentage of a type of behavior, where the shift in number exceeds a prescribed threshold.

25. The non-transitory storage medium of claim 24, wherein the shift in number corresponds to an increase in number or percentage of indicators of compromise each corresponding to a malicious behavior.

26. The non-transitory storage medium of claim 20, wherein the software evaluates whether the data associated with the behaviors has at least a prescribed degree of correlation with the data associated with the first plurality of behaviors by at least determining the degree of correlation between known indicators of compromise to indicators of compromise corresponding to the data associated with the behaviors detected by the first source.

27. The non-transitory storage medium of claim 20, wherein the determining of the threat level is based on a determination of a similarity in type or order of the received data associated with the behaviors detected by the first source and the data associated with the first plurality of behaviors received from the second source.

28. The non-transitory storage medium of claim 20, wherein the determining of the threat level is based on a determination of a prescribed change in number of indicators of compromise being at least a portion of the data associated with the behaviors detected by the first source.

29. The non-transitory storage medium of claim 20, wherein the degree of correlation between the data associated with the behaviors and the data associated with the first plurality of behaviors is varied based on an operating state of an electronic device performing the predictive analysis.

30. The non-transitory storage medium of claim 29, wherein the degree of correlation between the data associated with the behaviors and the data associated with the first plurality of behaviors is set to a first level when an electronic device performing the predictive analysis is in a first operating state, the first level requires the data associated with the behaviors to be in a same chronological order and present within the data associated with the first plurality of behaviors.

31. The electronic device of claim 1 is deployed as part of a cloud service.

32. The electronic device of claim 1 is an endpoint device.

33. The method of claim 9, wherein the performing of the predictive analysis is conducted as part of a cloud service.

34. The non-transitory stroage medium of claim 20, wherein the plurality of operations are conducted as part of a cloud service.

* * * * *